United States Patent

[11] 3,625,428

| [72] | Inventor | Charles D. Mecklin<br>Memphis, Tenn. |
|---|---|---|
| [21] | Appl. No. | 879,051 |
| [22] | Filed | Nov. 24, 1969 |
| [45] | Patented | Dec. 7, 1971 |
| [73] | Assignee | International Harvester Company<br>Chicago, Ill. |

[54] SWING AWAY GUIDE ARM
2 Claims, 5 Drawing Figs.

[52] U.S. Cl. ................................................. 239/166
[51] Int. Cl. ................................................. B05b 1/20
[50] Field of Search ......................... 239/159–166; 111/6, 7, 7.2, 69

[56] References Cited
UNITED STATES PATENTS

| 1,348,038 | 7/1920 | Neumeyer | 111/6 |
| 1,526,642 | 2/1925 | Nissley | 239/164 |
| 2,759,762 | 8/1956 | Kostka et al. | 239/159 X |
| 3,158,324 | 11/1964 | Oehler et al. | 239/159 |
| 3,435,785 | 4/1969 | Harbolt | 239/159 X |

FOREIGN PATENTS

| 65,741 | 11/1943 | Denmark | 239/159 |

*Primary Examiner*—M. Henson Wood, Jr.
*Assistant Examiner*—Edwin D. Grant
*Attorney*—Floyd B. Harman ABSTRACT: A sprayer assembly incorporating a nozzle carrying swing away guide arm on a mobile carrier for spraying operation proximate and beneath the carrier's structure, the guide arm being pivotally mounted such that it can be positioned for optimum spraying operation proximate the carrier and yet will swing upwardly and away from beneath the carrier's structure when raised to a transport position.

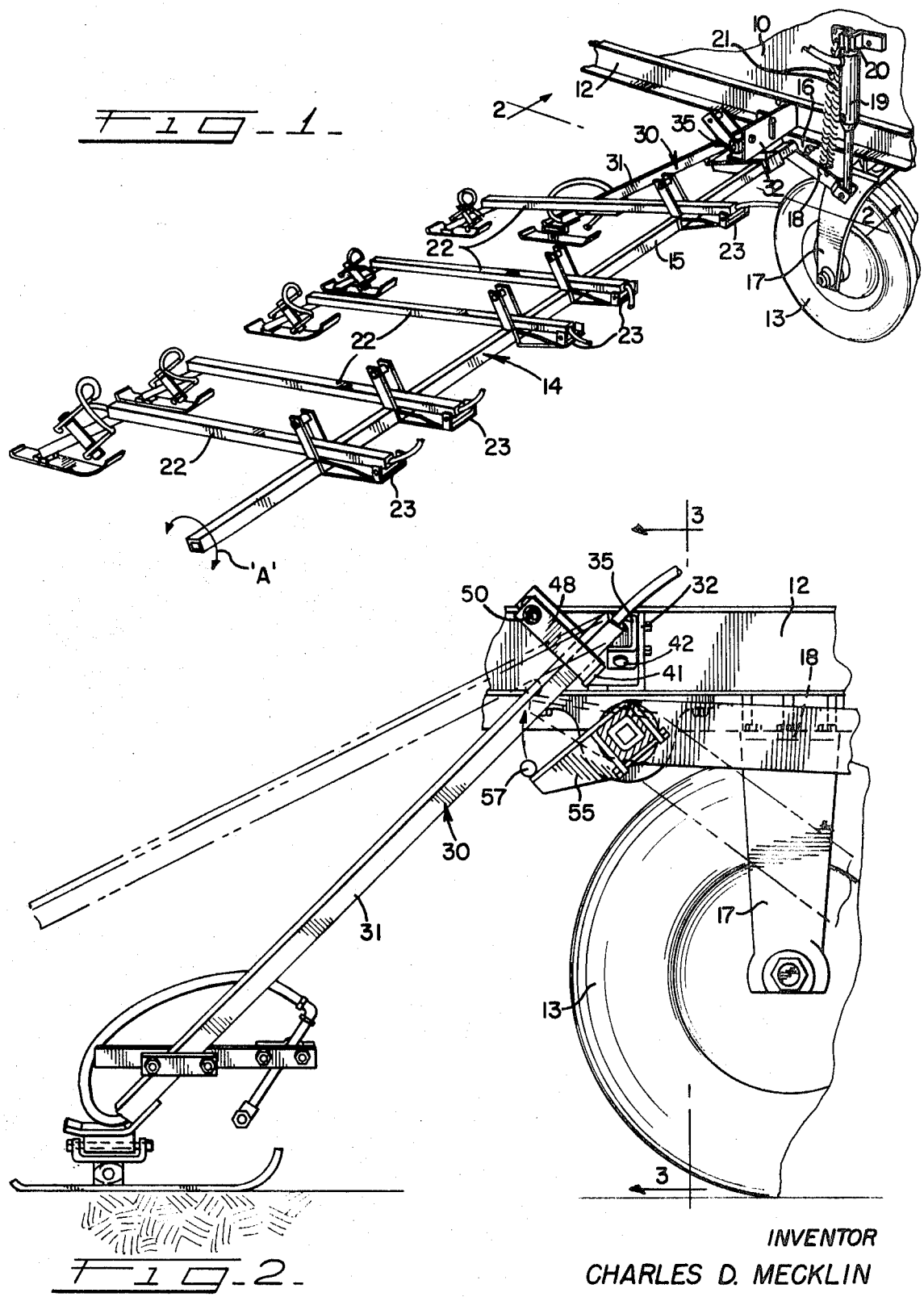

PATENTED DEC 7 1971 3,625,428
SHEET 2 OF 2
Fig-5-
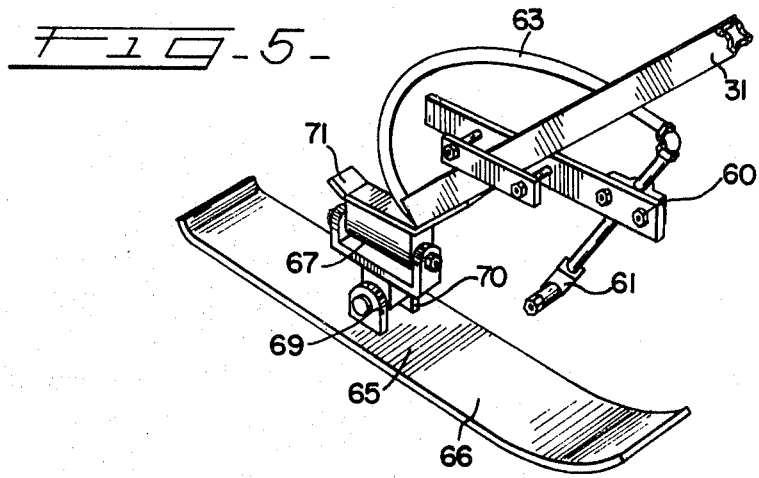
Fig-4-
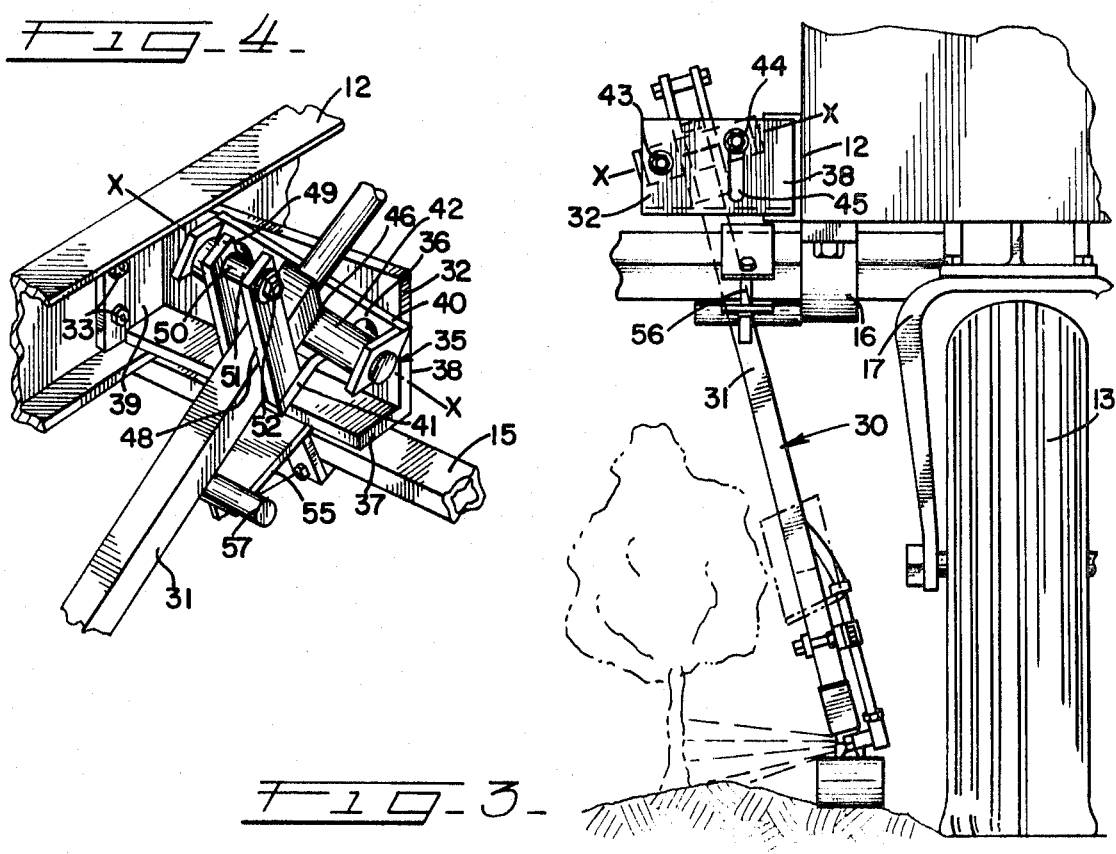
Fig-3-
INVENTOR
CHARLES D. MECKLIN

SWING AWAY GUIDE ARM

BACKGROUND OF THE INVENTION

This invention relates generally to crop environmental control devices such as sprayers and flame cultivators; and more particularly to sprayer assembly incorporating a guide arm for use in conjunction with a sprayer boom assembly adapted to be coupled to a mobile high clearance carrier vehicle movable along crop rows for spraying operations.

Spraying devices of the commonly called directspray or lay-by boom type are characterized by the requirement that the spray be accurately and precisely directed so as to cover that portion of the plants or the ground adjacent to the crop rows without overlapping spray patterns or other inaccuracies of spray placement.

One of the problems encountered with many conventional directed spray or lay-by boom-type devices is in the arrangement of the fluid distributing nozzles on the boom and the carrier. When a lay-by boom having a plurality of trailing guidearms for supporting nozzle arrangements is used a more accurate lateral spraying pattern can be realized, especially when the boom is positioned forward of the operator and therefore within his view. However when using this mode of spraying it has been difficult to provide a spray nozzle carrying structure for accommodating the row tracked by the front guidewheel of the carrier vehicle. Heretofore the structure supporting the front guidewheel was utilized for mounting spraying devices. Such mounting are stationary and subject to damage by entanglement with weeds or debris found in the head-lands at the end of the crop row. The other spray devices on the boom avoided this problem because those arms are raised to a transport position by the boom during the turnaround operation, however it has been found that the body of the carrier will interfere with raising of a guidearm when such a guidearm is positioned to spray within the crop row tracked by the guidewheel. The instant invention relates to the solution of this problem.

The general object of the invention is to provide a nozzle supporting guidearm which is positionable beneath the body of the high clearance carrier.

Another object of the invention is to provide a sprayer assembly having a nozzle supporting guidearm and an adjustable mounting wherein the mounting is effective to position the arm in a trailing relation for spraying operations and directing the arm up from under the body of the carrier when lifted to a transport position.

A still further object of the invention is to provide that the adjustable mounting define an axis on which the guidearm pivots and the attitude of this axis is selectively positionable relative to the carrier in a plurality of positions.

A further object of the foregoing is to provide that that boom assembly incorporate lifting means for lifting the arm in any selected position.

Another object of the invention is to provide a guidearm having a ground engaging shoe and including a Cardan-type connection to the lower end of said arm to maintain the shoe aligned with the arm at all times.

BRIEF DESCRIPTION OF THE DRAWINGS

FIG. 1 is a perspective view of a sprayer assembly mounted on a carrier and incorporating the swing away guidearm;

FIG. 2 is an elevational view taken at line 2—2 of FIG. 1;

FIG. 3 is an elevational view taken substantially at line 3—3 of FIG. 2;

FIG. 4 is a fragmentary perspective view of an adjustable mounting of the swing away guidearm; and FIG. 5 is a fragmentary perspective view of a ground engaging shoe connected to the swing away guidearm.

DESCRIPTION OF THE PREFERRED EMBODIMENT

Referring first to FIG. 1, there is shown the fragmentary front portion of a mobile carrier 10 which is of the self-propelled type and known in the art as a high clearance carrier. The carrier 10 has a guide wheel 13 supported by a carriage assembly 17. The carrier 10 also includes a longitudinal frame member 12 under which is disposed a transversely oriented sprayer boom assembly, generally designated 14. The boom assembly comprises a tubular boom arm 15 journaled to the carrier 10 by a plurality of pillow blocks, one of which is shown and designated as 16. The boom arm 15 is fastened in such a manner that it can be rotated about its own axis as indicated by the arrow "A". The boom arm 15 is rotated by a crank arm 18. Rotation in one direction is produced by having one end affixed to the arm 15 with the other end thereof pivotally connected to a single acting hydraulic ram 19 which is secured to the carrier by a bracket 20. It can be seen that by activating the ram 19 the crank arm is pushed in a downward direction and the boom arm 15 is caused to rotate clockwise. A pair of springs 21 are connected from the bracket 20 to the crank arm 18 and serve to retract the ram 20 and simultaneously rotates the boom arm 15 in a counterclockwise direction upon deactivation of the ram. It will be shown hereinafter that by rotating the boom arm in a clockwise and counterclockwise direction the boom assembly 14 is respectively placed in transport and operating positions.

The boom arm 15 carries a plurality of nozzle supporting guidearms 22, each pivotally connected to the boom arm by a bracket 23 which is adjustably clamped thereto and can be selectively positioned thereon to thereby adapt the boom assembly to varied crop row widths and spraying operations.

The instant invention, namely a swing away guidearm assembly, generally designated 30 is positioned on the carrier frame member 12 adjacent the boom arm 15, as seen in FIG. 1.

The swing away guidearm comprises a hollow tubular arm member 31 pivotally mounted to a L-shaped bracket 32 which is securely mounted by bolts 33 on the frame member 12. The bracket 32 is disposed to extend outwardly from the carrier in substantial alignment with the boom arm 15. The arm member is pivotally connected to the bracket 32 by an adjustable mounting, designated 35. The mounting 35 comprises clevis assembly 36 adjustably mounted on the L-shaped bracket 32.

Referring in detail to FIG. 4, the L-shaped bracket 32 comprises bottom and upright flanges 37 and 38 respectively welded to an end plate 39. The bracket 32 is secured to the frame member 12 by the bolts 33 through the end plate 39 with the bottom flange 37 positioned above the boom arm 15 in substantial alignment therewith.

The clevis 36 comprises a U-shaped member 40 having a lower flat plate segment 41 extending outwardly and below a pin 42 rotatably secured between opposed faces of the U-shaped member 40. The U-shaped member 40 is pivotally mounted at one point on the upright flange 38 by means of two bolts 43 and 44 respectively; as best seen in FIG. 3. The flange 38 has a slot 45 through which the bolt 44 is fastened and constrained to follow as the clevis pivots about the bolt 43. It can be appreciated that by loosening the bolts 43 and 44 the angular position of the clevis 36 can be varied within the limits defined by the slot 45 in the flange 38. In this way the attitude of the axis of rotation X—X, of the pin 42 can be selectively positioned and then fixed at a selected position by a retightening of the bolts 43, 44 and thereby resecuring the clevis to the flange 38 at that selected position.

One end of the arm 31 is affixed to the pin 42 by welds 46 and positioned thereon at an angle substantially normal to an axis X—X of the pin 42.

Downward travel of the arm 31 is arrested by engagement with the lower plate segment 41 of the clevis. A pair of guide members 48, 49 are welded to the lower segment 41 and serve as a guide to confine the swinging movement of the arm 31. A stop 50 comprising sleeve 51 and bolt 52 has been provided between the upper portion of the guide members to prevent excessive upward rotation of the arm.

A lifting arm 55 is clamped about the boom arm by means of a bolt arrangement 56, as best seen in FIGS. 2 AND 3. On the distal end of the lifting arm 55 is fastened a rod 57 disposed in substantial alignment with the boom arm 15 and has sufficient length to engage the guide arm 31 within the range of raising and lowering of that arm.

A nozzle supporting bracket 60 has been clamped on the lower end of the guidearm 60 as shown in FIG. 5. On this bracket 60 is mounted a spray assembly 61 fed by a flexible hose 63 threaded through the hollow tubular structure of the guide arm 31 to keep the hose 63 from contact and entanglement with plants as the hose extends upwardly.

The lower end of the guidearm 31 is supported by a ground engaging means 65 comprising a shoe 66 connected to the free end of the arm 31 by a Cardan-type connection in the commercial form of a universal joint 67. The universal joint 67 which is connected at one end to the shoe 66 by the lugs 69, 70 which are secured to the shoe. The other end of the universal joint is fastened to a plate 71 which in turn is affixed to the lower end of the guide arm 31. It should be noted that one of the axis of the Cardan-type connection is aligned with the arm 31 and the longitudinal extend of the shoe 66 to thereby keep the shoe in alignment with the arm 31 regardless of the ground contour.

In operation the swing away guide arm is adjusted to a particular row crop spacing and spraying situation by the loosening of the bolts 43 and 44 and angularly setting the clevis 36. It can be appreciated that the guidearm 31 will swing in a plane substantially normal to axis X—X of the pin 42 of the clevis. If the axis X—X is oriented in a horizontal position the guidearm 31 will swing in a vertical plane similar to the other guide assemblies 22 mounted on the boom arm 15. However, when the sides of the plants facing the crop row of the guide wheel 13 are to be sprayed the arm can be adjusted as shown in FIG. 3. It can be seen that the axis X—X is oriented at an acute angle relative to the horizontally disposed boom arm 15 and bracket 32. This results in the plane of swing in which the guidearm 31 is constrained to swing and having an orientation substantially aligned with the direction of travel but at an obtuse angle relative to the ground. FIG. 2 illustrates the lift arm 55 acting upon the guidearm in a partially raised condition. For when the boom arm is rotated through the action of the hydraulic ram 19 being extended, the lift arm 55 rotates in conjunction with the boom arm 15 causing the rod 57 to engage the guide arm 31. As the lift arm continues to rotate the guide arm 31 is lifted in a plane of swing determined by the attitude of the axis X—X of the clevis. As seen in FIG. 3, such an orientation would result in the guidearm 31, the ground engaging means 65 and the spray assembly 61 being lifted upwardly and outwardly from below the body of the carrier 10 thereby attaining an adequate transport height.

It should be noted that the flat plate segment 41 and the stop 50 define the limits of swing of the guidearm and are set to allowing the arm to swing free about the axis X—X within an expected range of operation. It also can be appreciated that the universal joint connection 67 between the shoe 66 to the lower end of the guidearm 31 constrains the shoe to remain aligned with the plane of swing and the direction of travel. However, through the free upward swing of the guide arm and the allowable pivotal movement of the universal joint the ground engaging means can follow the contour of the ground as it supports the guidearm 31. It will be appreciated that the embodiment of the invention chosen for the purposes of illustration and description herein is that preferred and based upon requirements for achieving the objects of the invention and developing the utility thereof in the most desirable manner, due regard being had to existing factors of economy, simplicity of design, and construction, production methods and the improvements sought to be effected. It will be understood, that the particular structure and functional aspect emphasized herein are not intended to exclude but rather to suggest such other modifications and adaptations as fall within the spirit and scope of the invention as defined in the appended claims.

What is claimed is:

1. In a sprayer assembly adapted for mounting on a mobile carrier having ground traversing means and movable along crop rows and operative for carrying crop spraying apparatus, the improvement comprising:
    bracket means mountable on said carrier in laterally displaced position thereto;
    sprayer-carrying arm means disposed alongside the carrier;
    means pivotally mounting said arm means to said bracket to provide swinging movement of the arm means in predetermined planes alongside said carrier;
    said mounting means including adjusting means for selectively laterally orientating said arm means;
    lift means on said carrier engageable with said arm means and operative to lift said arm means from an operating position to an elevated position adjacent said carrier; said lifting means comprising a rotatable member transversely disposed to said arm means in spaced relation thereto, means to rotate said member, an element secured to said member and having a surface in spaced relation thereto oriented to contact and lift said arm means from the operating to a transport position upon rotation of said member.

2. In a sprayer assembly adapted for mounting on a mobile carrier having ground traversing means and movable along crop rows and operative for carrying crop spraying apparatus, the improvement comprising:
    bracket means mountable on said carrier in laterally displaced position thereto;
    sprayer-carrying arm means disposed alongside the carrier;
    means pivotally mounting said arm means to said bracket to provide swinging movement of the arm means in predetermined planes alongside said carrier;
    said mounting means including adjusting means for selectively laterally orientating said arm means;
    lift means on said carrier engageable with said arm means and operative to lift said arm means from an operating position to an elevated position adjacent said carrier;
    ground engaging means mounted on the lower end of said arm means to operatively support said arm means whereby said spraying apparatus is maintained at a predetermined height above the ground regardless of variation in ground contour; said lifting means including a sprayer boom rotatably mounted on said carrier and transversely disposed to said arm means, means to rotate said boom, a rocker arm secured to said boom and having a surface in spaced relation thereto in contacting disposition to engage and lift said arm means upon rotation of said boom.

* * * * *